April 2, 1935. H. L. FERRIS 1,996,196
COW STALL
Original Filed Nov. 2, 1931  3 Sheets—Sheet 1
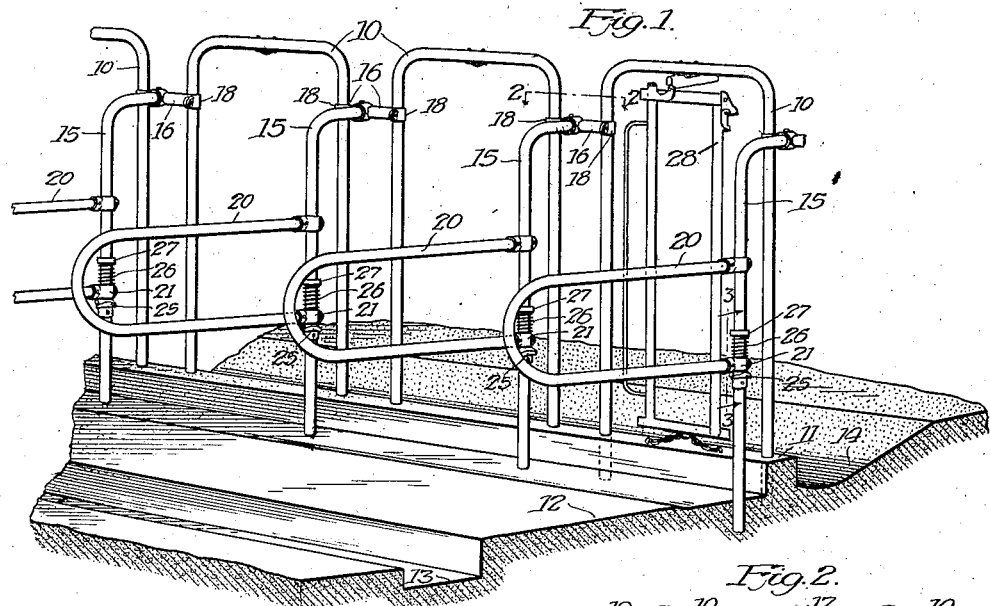
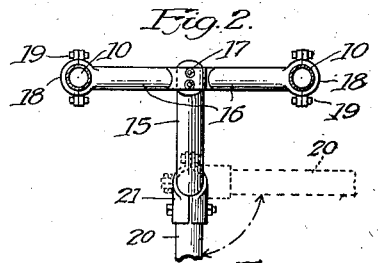
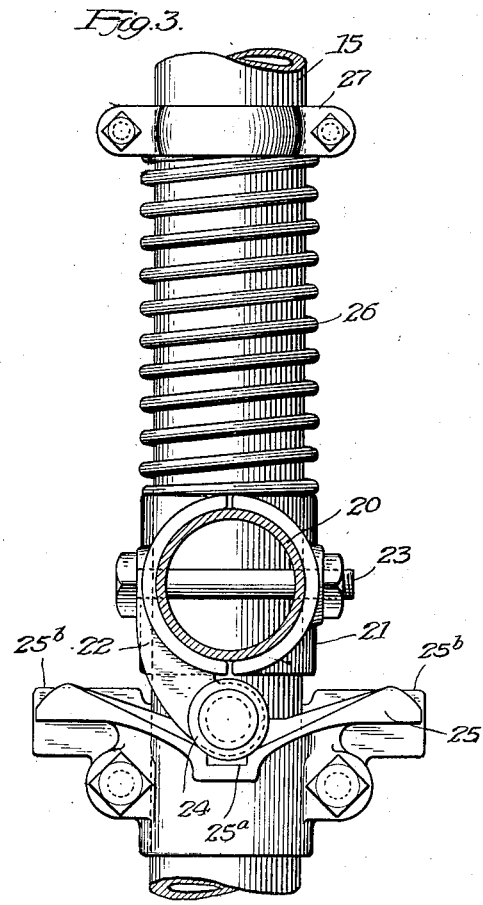
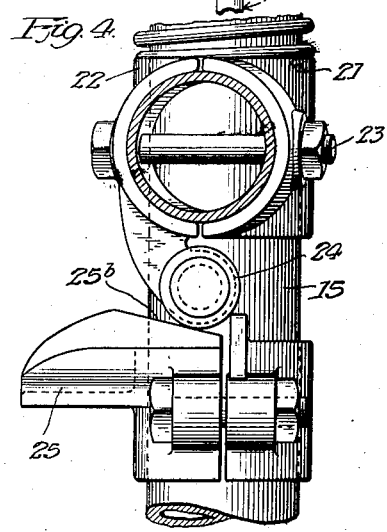
Inventor
Henry L. Ferris

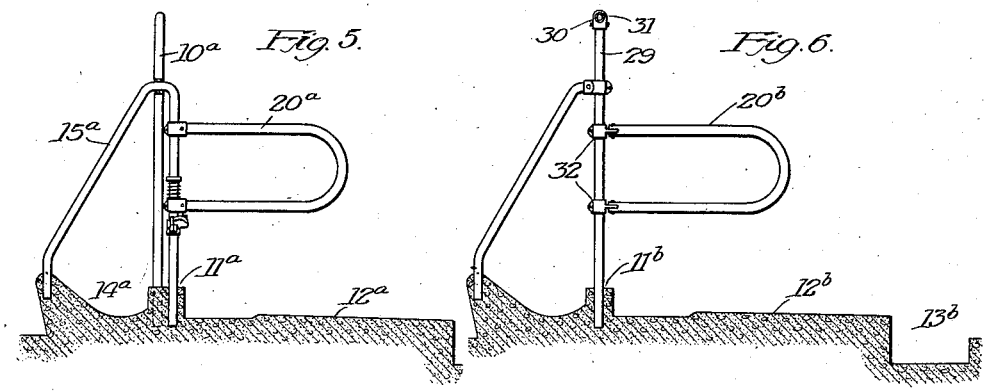
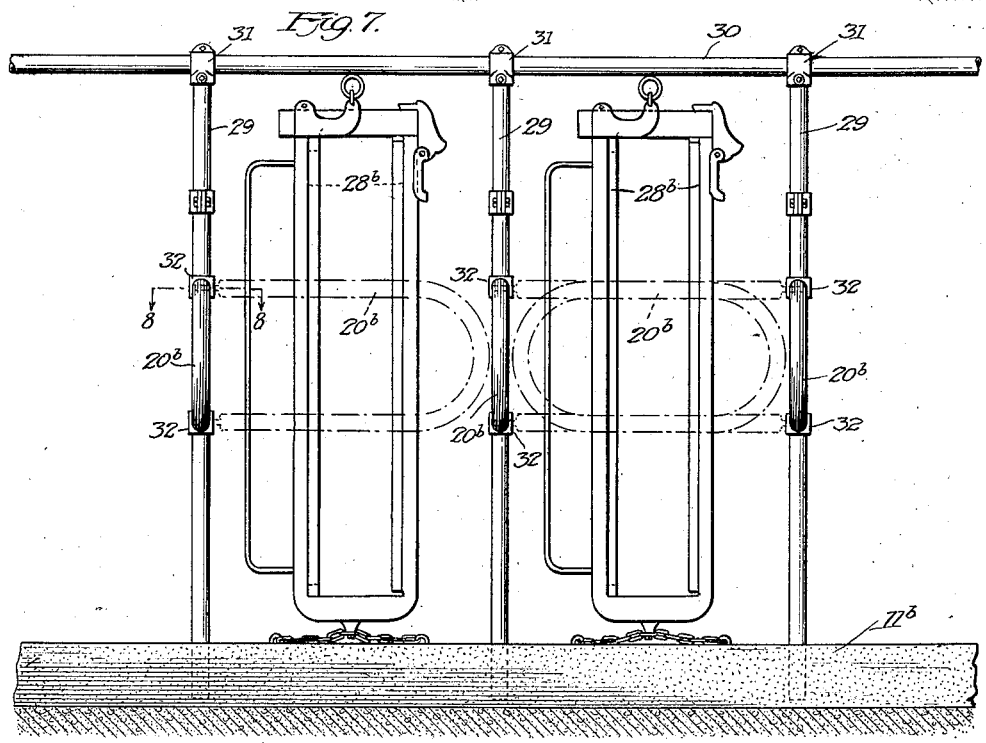
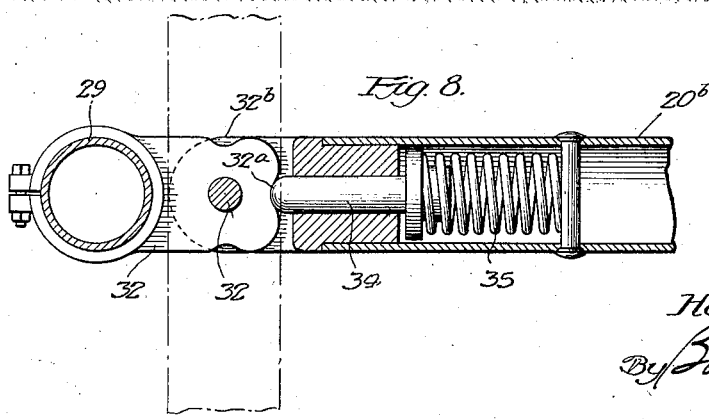

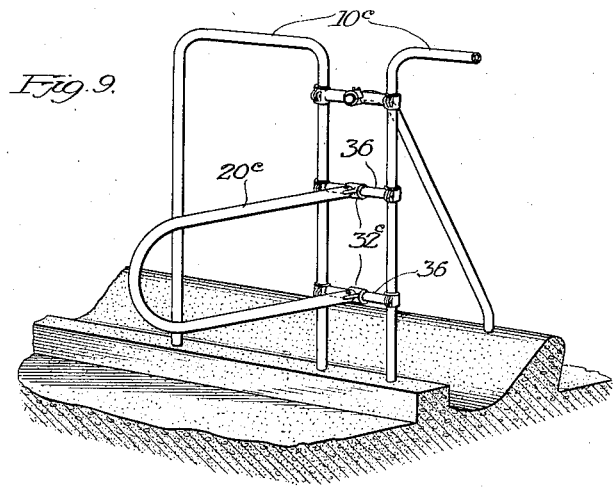
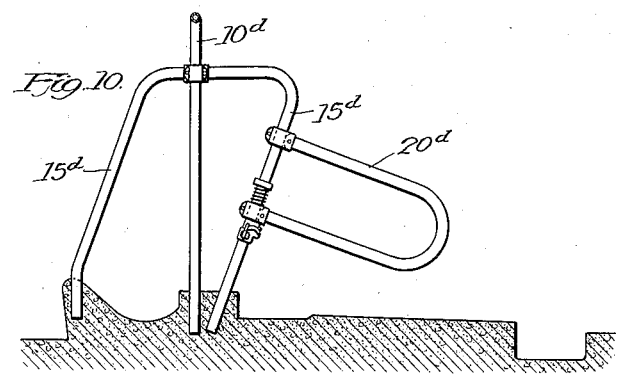
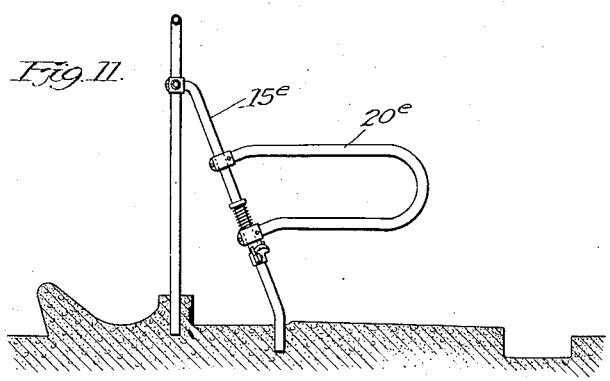

Patented Apr. 2, 1935

1,996,196

UNITED STATES PATENT OFFICE 1,996,196

COW STALL

Henry L. Ferris, Harvard, Ill., assignor to Starline Inc., Harvard, Ill., a corporation of Illinois Application November 2, 1931, Serial No. 572,458
Renewed September 1, 1934

13 Claims. (Cl. 119—15)

An object of this invention is to provide a cow stall with a partition which has no anchor in the stall floor, and which consequently will not be corroded by moisture thereon.

Another object is to provide such partitions which can be moved to one side to clear the line of stalls so that they may readily be cleaned as by means of a scraper which can be then dragged from one end of the stalls to the other.

Another object is to so hang such a partition that it can be swung to close the front of the next adjacent stall so that a cow will not have access to the manger of that stall.

Another object is the provision of means for adjusting the height of the partitions to suit the heights of the various cows to be handled.

Still another object is to provide means for readily shutting off portions of a row of stalls when fewer cows are to be housed, or as milking progresses from one end of the row to the other, so that the milker may have no solid partition in his way.

Another object is to provide a yielding partition so that if a cow lies against it, it will yield, adding comfort to the animal.

In the drawings:

Figure 1 is a partial perspective view of a series of cow stalls embodying the invention in a preferred form;

Fig. 2 is a partial enlarged section taken on the line 2 of Fig. 1;

Fig. 3 is a partial enlarged vertical section on the line 3 of Fig. 1;

Fig. 4 is a view similar to Fig. 3 showing the partition swung to a position substantially at right angles to that of Fig. 3;

Figs. 5 and 6 are views taken transverse to the line of stall fronts showing two modified forms of the invention;

Fig. 7 is a partial enlarged front elevation of the form shown in Fig. 6;

Fig. 8 is an enlarged detail on the line 8—8 of Fig. 7;

Fig. 9 is a partial perspective view of a modification; and

Figs. 10 and 11 are transverse views of modified forms of the invention.

Referring to the preferred form shown in Figs. 1 to 4 inclusive, the stall comprises stall fronts consisting of well known U-shaped front members 10 which are set in or secured to a curb 11 of the stall floor which is preferably made of concrete. This floor comprises, in addition to the floor proper 12 on which the cow stands, a gutter 13 at the back of the stall and a manger 14 at the front.

Stalls of this U-shaped form are usually braced from the concrete floor in some way. In the present instance this is done by means of a bent pipe brace member 15 which is set at its lower end in the concrete back of the curb 11, while the forwardly bent upper end is secured to the two U-shaped members 10 between which it stands by means of two spreader members 16, which are secured to the brace by means of bolts 17. Cap members 18 are secured to the ends of the spreader members 16 by means of bolts 19. This method of securing the brace member 15 to the stall fronts 10 is illustrative only.

A partition member 20 which is preferably of U-shaped construction is mounted to swing about the vertical portion of the brace member 15, and at the same time to be movable up and down on the brace member. This is accomplished by means of castings 21, 22, which are bolted to one end of the U-shaped partition member 20 by means of a bolt 23. One of the castings has a roller 24 mounted to turn thereon, this roller extending down so as to be in contact with a cam member 25, which is secured to the vertical portion of the brace 15. This cam has a central notch 25ª which corresponds to the position of the partition member when it extends midway between the stalls, as shown in Fig. 1.

At either side of the cam member 25 is a reversely inclined portion 25ᵇ which tends, when the roller 24 is pressed thereon, to hold the partition member 20 substantially at right angles to the position shown in Fig. 1. Fig. 4 illustrates the latter position of the partition member and roller 24, while Fig. 3 represents the midposition of these parts corresponding to the midposition of the partition member 20 shown in Fig. 1. A member 26 yieldably presses the cam follower roller 24 into contact with the cam 25. This spring abuts against a collar 27 which is adjustably secured around the vertical portion of the brace 15.

A stanchion 28, shown in dotted lines in the right-hand stall front of Fig. 1, is hung in each of these stall fronts in any manner well known to the art. A cow can then be secured in each of these stalls with her head held in the stanchion, while on each side of her extends a partition member 20 which divides her stall from that next adjacent. This partition is yieldable so that if she presses against it, it will move to one side under the pressure thus exerted, but, owing to the action of the spring 26 in pressing the follower cam against the cam 25 with increasing force, will urge the cow back towards the center of the stall and the partition 20 will be returned to its original position as soon as the pressure which she exerts is withdrawn.

In Fig. 5 is a shown a modified form of stall front 10ª which is secured by means of a brace member 15ª which extends from the curb 11ª to the front of the manger 14ª. This brace is secured to the stall fronts in substantially the same way as that shown in Figs. 1 and 2. The partition member 20ª is also made and secured to the vertical rear portion of the brace 15ª in the same way as that shown in Figs. 1 to 4. It will be observed in Fig. 5 that this vertical portion of the brace extends back of the stall front only about sufficient to permit the partition 20ª to move through an arc of substantially 180°. This form has the advantage of leaving the entire stall floor back of the curb entirely clear, which greatly facilitates the cleaning of the stalls and prevents water on the stall floor from reaching any portion of the iron pipes of the stalls which are imbedded in the concrete.

Fig. 6 illustrates this form of stall partition applied to another well known form of stall in which the vertical members 29 are all in one line, and are imbedded at their lower ends in a curb 11ᵇ, while the upper ends are secured to a pipe 30 by means of suitable castings 31. It is preferable in this form also that the partition member 20ᵇ should be capable of swinging so as to lie parallel to the front of the stall at either side, and a means for accomplishing this is shown in detail in Fig. 8. To do this a casting 32 is secured to the vertical pipe 29 at each end of the U-shaped partition member 20ᵇ, the partition member being pivotally secured thereto by means of a bolt or pin 33. The casting 32 has a cam formed in its outer face, a notch 32ª corresponding to the midposition, and the notches 32ᵇ corresponding to the two end positions of the partition member. A cam follower 34 is slidably mounted in the ends of the partition and is urged against the face of this cam by means of a spring 35.

It will be observed in Fig. 7 that there are three vertical members 29, each of which carries a partition 20, and that these partition members are preferably only slightly less in length than the width of a stall so that when folded over they will substantially close the front of the stall, so that a cow cannot force her head through the stall front so as to reach the manger. The right-hand side of this figure also illustrates the fact that these partitions may be swung either to the right or to the left to effect this closure. Thus, if it is desired to block off a series of stalls this is very easily and effectively accomplished by turning the stall partitions so as to close the front of the stalls which it is desired will not be occupied. A cow will not attempt to occupy any of the space ordinarily covered by the stalls, but will go on until she finds a stall which is open and ready for her occupancy.

In Figs. 9, 10 and 11 are shown three other modifications of this invention. In Fig. 9 the U-shaped movable partition member 20ᶜ is hingedly mounted on brackets 37ᶜ which are similar to the brackets 32 of Figs. 6, 7 and 8, except that they are mounted on horizontal braces 36 which are adjustable for height on the vertical sides of the U-shaped fronts 10ᶜ to which they are clamped, as previously described. These brackets 32ᶜ are preferably provided with cams similar to those of the member 32 of Fig. 8, in which case, a spring 35 as in Fig. 8 urges a cam follower against the face of the cam, thereby tending to maintain the partition member 20ᶜ in a midposition between the stalls.

Fig. 10 shows another modification in which the partition 20ᵈ is carried on a rearwardly extending portion of a brace 15ᵈ which extends forward and is anchored in the concrete at the forward edge of the manger. Fig. 11 shows another modification in which a nearly U-shaped partition member is rotatably mounted at its two ends on a rearwardly inclined brace member 15ᵉ. Both 20ᵈ and 20ᵉ are preferably mounted as is the partition member 20 of Fig. 1. That is, these partition members are rotatably mounted about these tubular brace members, and are also slidable thereon and are urged toward a cam which tends to maintain each partition member in a central position.

It will be observed with what ease the stalls can be cleaned owing to the fact that no portion of the stall frame enters the concrete back of the brace 15 of Fig. 1, or back of the curb in Figs. 5 and 6. This stall lends itself very well to a power scraper which can be thus moved from end to end of the stalls without meeting with any obstruction.

This form of stall partition also lends itself to easy adjustment in height to accommodate cows of various sizes. To adjust it for a taller cow, it is necessary merely to loosen the bolts which hold the cam member 25 and the collar 27 of Fig 3, raise these to the desired height and again clamp them to the brace 15, setting the collar 27 to the desired compression of the spring.

In case a cow lies down against this partition it will yield and do her no harm, whereas with a fixed partition harm sometimes results. In milking a herd, the milker can start at one end of a row releasing each cow as she is milked and closing her stall by swinging the partition across her stanchion, thereby leaving her no stall to stand in and providing more light for the cows left to be milked. This also assists the milker since he has no solid partition in his way.

In this way the shrinkage of the herd at certain seasons of the year is provided for. It is not necessary to open any stalls except just enough for the herd then to be milked.

I claim:

1. A cow stall including a stall front and an upright member at each side of said stall, a vertically slidable partition member mounted to swing about each of said upright members, a cam carried by each of said upright members and having notches corresponding to middle and end positions of the partition member, each of said partition members having means slidably engaging said cam member, and vertically adjustable means for securing said cam members on said upright members, whereby to position said partitions at a desired height from the stall floor.

2. A cow stall including a stall front and an upright member at each side of said stall, a vertically slidable partition member mounted to swing about each of said upright members, a cam carried by each of said upright members and having notches corresponding to middle and end positions of the partition member, each of said partition members having means slidably engaging said cam member, spring means cooperating with said upright and partition members and exerting force upon said partition members to normally maintain the partition members in position at substantially right angles to the stall front, and vertically adjustable means for securing said cam members on said upright members, whereby to position said partitions at a desired height from the stall floor.

3. A cow stall including a stall front and cow-aligning partitions positioned at each side of said stall to extend at substantially right angles to said stall front, one of said partitions comprising a laterally yieldable portion, spring means cooperating with said portion and a fixed part of said stall to normally maintain said portion in position at substantially right angles to the stall front, and said means being operable to exert pressure with increasing force upon said portion as said portion is deflected from its normal position, means whereby the partition may be held in another predetermined position at an angle to the first position, said partition being of a length less than the width of the stall whereby said partition will not overlap another partition when swung in the same direction, said pressure exerting means being adapted to cause the partition to exert pressure on the cow to maintain the cow toward the center of the stall only when the partition is moved to an angle less than 90° from its first position.

4. A cow stall including a floor having a curb at the forward end, a stall front mounted to extend vertically above said curb, a rigid upright partition member secured to said stall front and anchored to the floor at the rear of said stall front and curb, a yieldable partition member journaled on said rigid member to form a rearward extension thereof, said yieldable partition member comprising a pipe section of substantially U-shaped formation, and pressure exerting means cooperating with the fixed and movable partition members and exerting force upon said movable member to normally maintain the movable member in position at substantially right angles to the stall front.

5. A series of stalls facing in the same direction and having fronts substantially in alignment, upright members secured to the rear of the stall fronts and positioned at each side of said stalls, a yieldable cow-aligning partition member journaled on each upright member, pressure exerting means cooperating with said fixed and yieldable members and exerting force upon said yieldable members to normally maintain them in positions at substantially right angles to the stall fronts, said partition members being of a length less than the width of the stalls, and means to secure a pair of said partition members in overlapping relationship adjacent one stall front so as to extend in planes substantially parallel therewith.

6. A series of cow stalls of pipe construction facing in the same direction and having fronts substantially in fixed non-adjustable alignment, a vertical member secured to the stall floor in the rear of the front and being disposed between each pair of the stalls near the front and forming a brace therefor, a partition member freely and hingedly mounted on each of said vertical members and adapted to be swung individually so as to leave the stall floor clear in the rear of its respective vertical member and to close the front of either stall and to serve in a midposition as a partition between the stalls, and spring means tending to maintain the partition in central position for the purposes set forth, said hinge mounting lying in the plane of the partition member.

7. A plurality of adjacent cow stalls each including a stall front, means for connecting said fronts including a brace member secured to the stall floor, a partition member hingedly connected to each of said connecting means near the front and supported solely thereon and adapted to swing about a vertical axis just back of said front so that each partition member can be swung individually to a position substantially parallel to and just back of the front of the stall at either side of said means, and means for urging the partition member toward a midposition when moved therefrom in either direction, the axis about which the partition member swings lying in the plane of the partition member.

8. A cow stall including a stall front of pipe construction having a stanchion adapted to receive a cow's head, and a brace member back of the stall front and secured thereto at an upper point and secured to the stall floor at its lower end, the lower part of the stall front being secured to the floor independently of the brace member, a partition member mounted to swing about said brace member, and spring-actuated means tending to return the partition to the central position between the stalls if moved therefrom in either direction, the brace member lying in a vertical plane, the partition and a portion of the brace member being in the same plane in all positions of the partition member.

9. A series of cow stalls of pipe construction facing in the same direction and having fronts secured solely to the floor of the stall and substantially in alignment, a brace member connected to adjacent fronts of the stall and to the floor and being disposed between each pair of the stalls and in substantially fixed non-adjustable alignment, a partition member hingedly mounted on each of said brace members and adapted to be swung to either side of the central position so as to leave the stall floor clear in the rear of its respective brace member and to close the front of either stall and to serve in a midposition as a partition between the stalls, and spring means tending to maintain the partition in the central position for the purposes set forth, the partition member and a portion of the brace member lying in the same plane in all positions of the partition member.

10. A cow stall having a stall front of pipe construction supported entirely by the floor of the stall, and a partition member carried thereby and mounted to swing about a single axis adjacent said front and in the plane of the partition member, said axis being in a vertical plane which is at right angles to the stall front, said partition member being yieldable under lateral pressure, and a spring means tending to return said partition member to a midposition when said pressure is removed whereby a cow leaning against said member is urged back into her stall.

11. A plurality of adjacent cow stalls of pipe construction each including a stall front having a stanchion adapted to receive a cow's head, means for connecting said fronts, a U-shaped partition member hingedly and resiliently connected to said connecting means near the front and supported solely thereon and adapted to swing about a single axis in a vertical plane just back of said front and well above the floor of the stall so that the partition member can be swung to a position substantially parallel to and just back of the front of the stall at either side of said means, and spring-pressed means tending to return the partition member to a midposition when moved therefrom in either direction, the axis about which the partition swings lying in the plane of the partition in all positions thereof.

12. A plurality of adjacent cow stalls of pipe construction each including a stall front having a stanchion adapted to receive the cow's head, means for connecting said fronts, a U-shaped partition member hingedly and resiliently connected to said connecting means near the front and supported solely thereon and adapted to swing about a single axis in a vertical plane just back of said front and well above the floor of the stall so that the partition member can be swung to a position substantially parallel to and just back of the front of the stall at either side of said means, and a cam having a plurality of sloping faces and a spring-pressed cam follower tending to return the partition to the central position if moved therefrom and to maintain the partition in either of its end positions, the axis about which the partition swings lying in the plane of the partition in all positions thereof.

13. A plurality of adjacent cow stalls of pipe construction each including a stall front having a stanchion adapted to receive a cow's head, an upright member anchored to the floor and forming part of the stall, a partition member mounted to swing about said upright member at a height well above the floor to provide ample clearance thereover, a cam secured on the upright member having faces sloping toward a midposition of the partition member, and a face at each side corresponding to side positions of the partition member wherein the latter is at substantially right angles to the midposition so that the partition member lies across the front of the stall at either side of the partition, a cam follower carried by the partition member, and a spring for forcing the cam follower against the cam faces.

HENRY L. FERRIS.